April 20, 1965   L. J. STOYANOFF ETAL   3,179,004
READING TRAINING DEVICE FOR USE WITH A FILM STRIP
Filed Oct. 21, 1960   3 Sheets-Sheet 1

INVENTOR.
LOUIS J. STOYANOFF AND
EDMUND M. DiGIULIO
BY Ralph N. Kalish
ATTORNEY

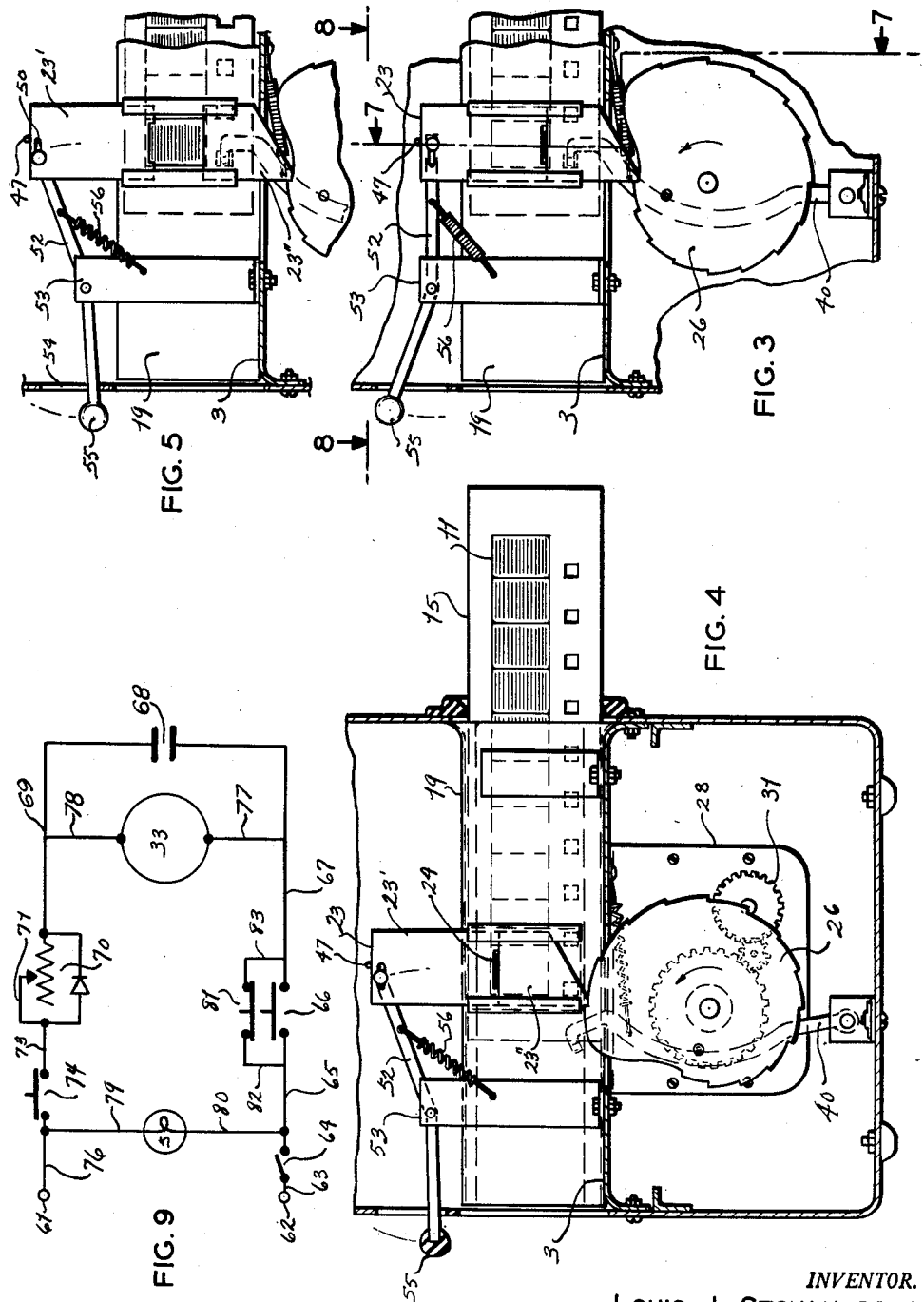

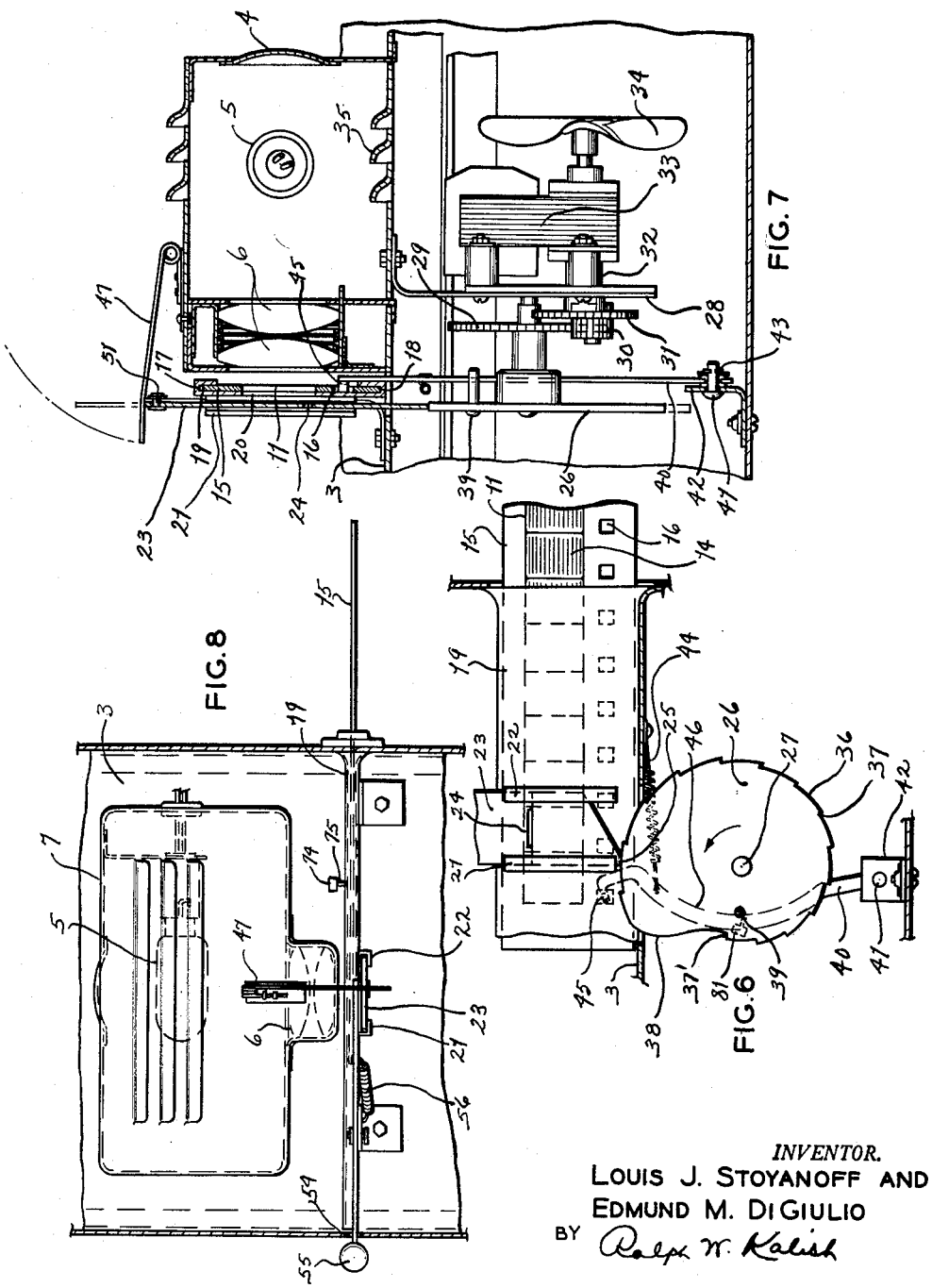

United States Patent Office 3,179,004
Patented Apr. 20, 1965

3,179,004
READING TRAINING DEVICE FOR USE WITH A FILM STRIP
Louis J. Stoyanoff, Woodland Hills, and Edmund M. Di Giulio, Sherman Oaks, Calif., assignors to Craig Research, Inc., Los Angeles, Calif., a corporation of California
Filed Oct. 21, 1960, Ser. No. 64,025
5 Claims. (Cl. 88—28)

This invention relates in general to the field of education, and, more particularly, to a reading training device.

It is a primary object of the present invention to provide a reading training device which is adapted and designed primarily for individual, self-instructive usage, being compactly constructed, and having a simplicity of parts for effecting reliable and highly durable use.

It is another object of the present invention to provide a rapid reading training device which incorporates means for exposing or exhibiting reading matter or symbols in sequential manner at a preselected rate, having means for easily varying and controlling such rate, so that a user may continually enhance his reading proficiency.

It is a further object of the present invention to provide a device of the character stated which incorporates novel shutter-operating means for progressive projection of like portions of the reading matter, which means is consistent in operation, being resistant to breakdown; which comprises unique film-advancing means; and which embodies certain new and useful improvements in circuitry.

It is an additional object of the present invention to provide a reading training device which may be so economically produced that the same may be made available for use upon a scale hitherto unknown.

Other objects and details of the invention will be apparent from the following description, when read in connection with the accompanying drawings (three sheets) wherein—

FIGURE 3 is a vertical transverse section taken on the line 3—3 of FIGURE 2, showing the shutter in lower position.

FIGURE 4 is a vertical transverse section taken substantially on the line 3—3 of FIGURE 2, showing the shutter in upper or starting position.

FIGURE 5 is a fragmentary, vertical section taken substantially on the line 3—3 of FIGURE 2, showing the shutter components in parted relationship.

FIGURE 6 is a vertical transverse section taken substantially on the line 3—3 of FIGURE 2, showing the film advancing arm in fully advanced position.

FIGURE 7 is a vertical transverse section taken on the line 7—7 of FIGURE 3.

FIGURE 8 is a horizontal transverse section taken on the line 8—8 of FIGURE 3.

FIGURE 9 is a wiring diagram.

Figure 2:
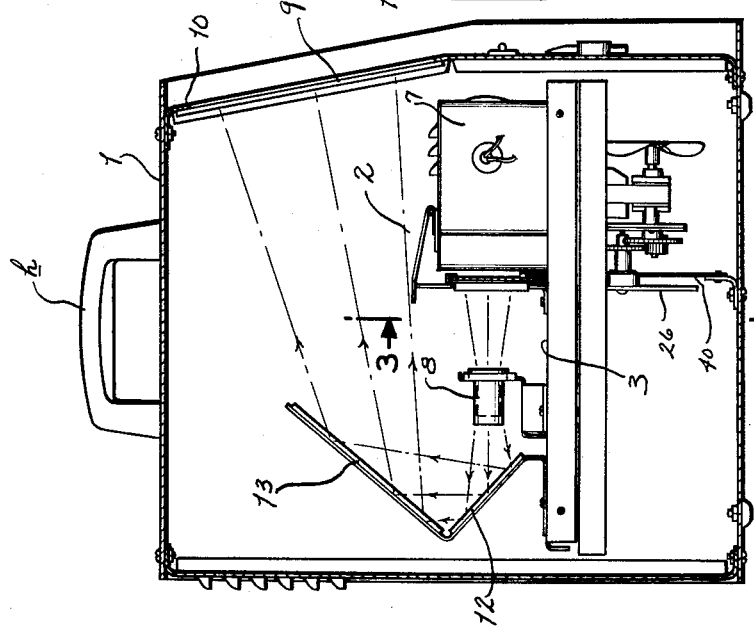
FIGURE 2 is a vertical transverse section taken on the line 2—2 of FIGURE 1.

Referring now by reference characters to the drawings, A generally designates a reading training device incorporating a housing 1, formed as of sheet metal, plastic, or like material, and being designed for portability by provision of a handle *h*. Within housing 1 is disposed a projector 2 supported on a transverse horizontal plate 3 and having the customary parabolic reflector 4, lamp 5 and condensing lenses 6 enclosed in a casing 7, and a projection lens system 8. In the particular form of apparatus shown, reading matters or symbols, indicated at *r*, are projected upon a translucent screen 9, as of ground glass, from behind or within housing 1, so that an individual may view the projected reading matter from the exterior of device A; said screen 9 being received within a window 10 in housing 1. The reading matter or symbols *r* which are to be viewed are carried by a film strip 11 and projected onto reflector means comprising mirrors 12, 13 and thence onto screen 9 with the path of the light rays being indicated by arrows in FIGURE 2.

Figure 1:
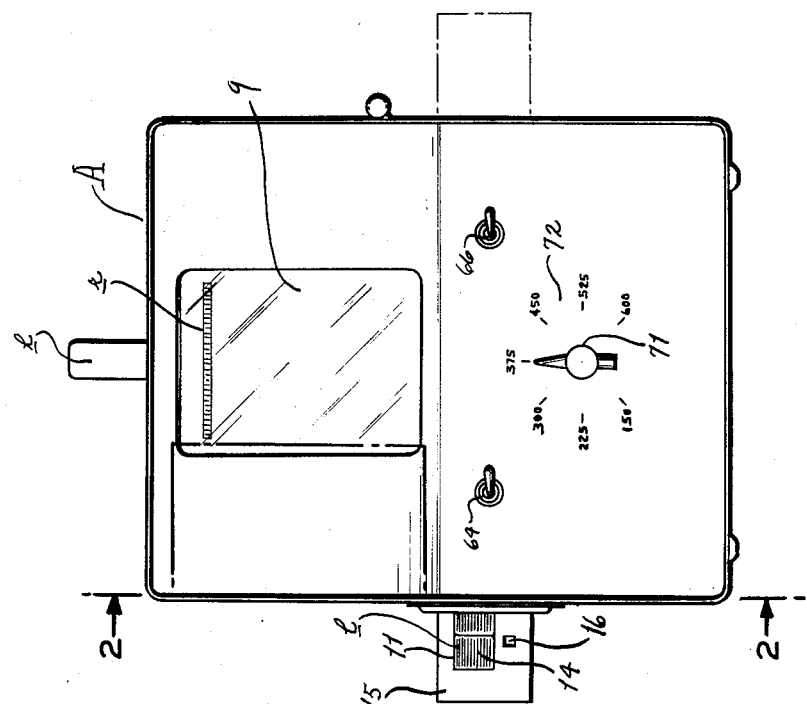
FIGURE 1 is a front view of a reading training device constructed in accordance with and embodying the present invention.

Film strip 11 is divided into a plurality of frames 14 dimensioned for successive projection, and having reading matter provided thereon in a series of horizontal lines *l*. Said strip 11 is mounted within a relatively rigid, film carrier 15, fabricated as of cardboard, plastic, or like material, and being provided in its lower portion with a plurality of apertures 16 arranged for correspondence to frames 14. Film carrier 15, is designed for feeding to projector 2 through one side of device A, as from left to right as viewed from the front of device A (FIGURE 1) for periodic advancement transversely thereof, to present frames 14 sequentially to the cooperating lens systems. Carrier 15 is adapted for reception within upper and lower slide-forming grooves 17, 18 provided on the upper and lower edges of the side of a partition plate 19 confronting condensing lenses 6; said plate 19 extending across the interior of housing 1 in planar normal relationship to horizontal plate 3, and being disposed between condensing lenses 6 and projection lens system 8. Plate 19 is provided with a frame opening 20, aligned with lamp 5 and coextensive with a frame 14 of film strip 11. Mounted on the other face of partition plate 19, proximate projection lens system 8, on opposite sides of frame opening 20, is a pair of vertically disposed, cooperating guideways 21, 22 for slideably accommodating a flat or relatively narrow, elongated shutter 23.

Shutter 23 contains a transverse, slit-like opening 24 presented for alignment with frame opening 20 and being substantially of like width as film frames 14 so that there may be projected therethrough a single line of reading matter or symbols *r*. The bottom edge of shutter 23 is obliquely formed whereby the lowermost portion thereof constitutes a cam follower 25 which ridingly engages the periphery or operating edge of a cam wheel 26 disposed therebelow and adapted for rotation in the direction of the arrows indicated in FIGURE 3. Cam wheel 26 is mounted upon a shaft 27 which is journalled on a vertical support plate 28 provided within housing 1, there being a driven gear 29 carried on the inner portion of said shaft 27 for meshing with an idler gear 30 which latter engages a driving gear 31 fixed on the drive shaft 32 of a variable speed motor 33, also mounted on plate 28 and being preferably of the shaded pole type. At its opposite end, drive shaft 32 may mount a fan blade 34 for inducing a flow of cooling air within casing 7, as through louvers 35.

The major portion of cam wheel 26 is formed on decreasing radii to provide a plurality of segments 36 delimited by a series of indentations or steps 37 corresponding numerically to the lines of reading matter or symbols *r* on a film frame 14. As cam wheel 26 is rotated, shutter 23 will be caused to step-wise descend as cam follower 25 successively engages steps 37 at a constant rate, whereby the lines of reading matter *r* will be sequentially projected through shutter opening 24 in reading progression from top to bottom. The time or extent of dwell or exposure for each line of reading matter *r* will depend upon the rate of angular travel of cam wheel 26; it being recognized that for any predetermined speed, each line will be exposed for the same interval. FIGURES 4 and 3 respectively illustrate the relationship of shutter 23 and cam wheel 26 when the former is in uppermost or starting position and in lowermost or terminal position. Thus, by the unique coaction of shutter 23 and cam wheel 26, the lines of reading matter or symbols *r* of frames 14 are projected to a viewer in sequence at a predetermined periodicity. Upon arrival at lower position (FIGURE 3) shutter 23 through continued rotation of cam wheel 26 will be liftingly restored to starting position by engagement of its cam follower 25 with a bulging or rounded edge portion 38 on cam wheel 26.

Fixed to cam wheel 26 for movement therewith and projecting inwardly from its inner face, or toward motor 33, is a pin 39, being located thereon in proximate radial alignment with the terminal indentation 37' for engaging a film advancing arm 40 formed of flat stock, being swingably mounted at its lower end on a pivot pin 41 supported on a bracket 42 fixed on the base wall of housing 1; there being a spring 43 engaged about pivot pin 41 and bearing at one end against arm 40 to allow limited "play" thereof axially of said pin 41. Said arm 40 is engaged in its upper portion to one end of an extension spring 44, the other end of which is fixed to horizontal plate 3 for biasing arm 40 toward the side of device A through which film carrier 15 is fed. At its upper end arm 40 extends upwardly between condensing lenses 5 and partition plate 19 and is provided with an outturned finger 45 extending toward projection lens 8, immediately above groove 18 in planarwise normal relationship to the body of arm 40 for projection into the path of travel of film carrier 15 for reception within the aperture 16 of the frame 14 to be projected, for reasons presently appearing. The central portion of arm 40 is located on the side of shaft 27 remote from the film feeding side of housing 1 and is arcuated, as at 46, to define a camming surface for engagement by pin 39 as the latter describes an arc of movement upon rotation of cam wheel 26.

As film carrier 15 is inserted or fed into device A, arm 40 will, through engagement with pin 39, be in the position shown in FIGURE 4, with spring 44 being under tension and with finger 45 extending across the entering end of carrier 15. As pin 39 loses engagement with arm 40 upon rotation of cam wheel 46, arm 40 will, through spring bias, be freed for return rocking movement about the axis of pivot pin 41 with finger 45 "snapping" into aperture 16 of the frame 14 presented for projection (FIGURE 3). When pin 39 next engages the central camming surface 46 of arm 40, the latter will be forced to rock in a direction away from shaft 27, causing spring 44 to be placed once again under tension, whereby the upper end of arm 40 will be moved transversely, or to the left of device A in FIGURE 3, 4, or 5, pulling film carrier 15 therewith so as to thereby present the next frame 14 for projection. The degree of arc of arm 40 is such that its upper end will be caused to travel a linear distance substantially equal to the width of the frame 14. It should be noted that carrier 15 is sufficiently intimately held by the grooves 17, 18 so that it will not be driven in the wrong direction, that is, toward the feeding side of device A, by arm 40, upon the same being freed from engagement with pin 39 so that said arm 40 will be forced to swing inwardly toward condensing lenses 5, against pivot spring 43, to permit of the movement from one aperture 16 to the next.

For assisting in reliable operation of shutter 23 there is provided a spring member 47, which may be of the hinge type, suitably mounted on the upper surface of casing 7 and having one end in constant abutment against the upper edge of said shutter 23 for biasing same downwardly.

As is patent, shutter 23 may be integrally formed from a single section of sheet stock. However, in the embodiments shown in the drawings, the same is of two-part construction, having upper and lower components 23', 23", respectively, which are normally in edge to edge engagement on their lower and upper edges, respectively, with the line of contact being continuous with the lower margin of shutter opening 24. In its upper end portion, shutter component 23' is provided with a transverse, central aperture 50 within which reciprocally rides a cam 51 provided at the inner end of an angulated arm 52, pivotally mounted on a frame element 53 secured upon plate 3 and projecting at its outer end through an opening 54 in the side of housing 1; there being a knob 55 on its end extremity. An extension spring 56, being engaged at its lower outer end on frame element 53 and at its upper end on arm 52, biases the latter into downward position. Thus, desirably after shutter 23 has arrived at the lower limit of its movement, arm 52 may be manually rocked, by application of downwardly directed pressure upon knob 55 to raise shutter component 23', thereby effecting parting between said components 23', 23", causing tension to develop in springs 56 and 47, whereby the shutter components are moved away from each other to increase the area of exposure of the adjacent film frame 14, to the full extent, if desired, to allow the viewer to determine the accuracy with which the individual line *l* of reading matter *r* were viewed. Such reviewing operation may obviously be effected while shutter 23 is being returned upwardly by cam 26. FIGURE 5 illustrates shutter components 23', 23" in opened, parted position, with a film frame 14 completely exposed for projection in its entirety upon screen 9.

The device of the present invention incorporates an operating circuit which is diagrammatically illustrated in FIGURE 9, and to which reference is now made. Power terminals 61, 62 are connected to a source of electric power, preferably 110 volt, 60 cycle, single phase, alternating current, as would be customarily available through conventional wall outlets. Terminal 62 is connected by lead 63 to a power switch 64, which may be of the slide type, and being for convenience operable from the outer face of housing 1, beneath screen 9. The other side of switch 64 is in circuit through a connector 65 with one side of a normally open, starting switch 66, preferably of pushbutton character, and being positioned on the front wall of housing 1. A lead 67 extends between the other side of starting switch 66 and a condenser 68 which may have a capacity of about 100 microfarads. Condenser 68 is connected by a conductor 69 to a variable resistor 70, such as a rheostat diode speed controller, having a contact arm 71 located on housing 1 centrally of a dial face 72 indicating the various motor speeds in terms of the rate of words per minute exposed by shutter 23, so that a viewer may select the rate at which he wishes to attempt to read the projected reading matter *r*. Resistor 70 is engaged through a lead 73 to a normally open, microswitch 74 disposed adjacent the side of housing 1 through which film carrier 15 is fed, having an operating arm 75 (FIGURE 8) extending into the path of said carrier for circuit closure by engagement therewith. A conductor 76 connects microswitch 74 with power terminal 61. Connected across leads 67, 69 by branch connectors 77, 78, respectively, is alternating current motor 33.

Projection lamp 5 is in circuit between power terminals 61, 62 by conductors 79, 80. A normally closed microswitch 81 is engaged between leads 65, 67 by branch leads 82, 83 for by-passing starting switch 66. As may be seen in FIGURE 6, said switch 81 is engaged for operation by pin 39. It will be noted that the circuit will at all times be open if there is no film carrier 15 in device A, since switch 74 is normally open.

The operation of device A is as follows: With reference being made to FIGURE 4, with shutter 23 in uppermost or starting position; film carrier 15 inserted within device A with its first frame 14 presented for projection; switch 74 being closed by engagement with said carrier 15; pin 39 in contact with switch 81 holding same in circuit-open position, and advancement arm in advanced position, a user, having set contact arm 71 to the desired speed indicated on dial face 72, will then close power switch 64 and operate pushbutton starting switch 66 to close the circuit for energization of motor 33. As motor 33 causes rotation of shaft 27, pin 39 will substantially immediately lose contact with line switch 81, releasing same for circuit closing through its inherent bias, thereby allowing the circuit to by-pass switch 64 which will have become opened. As described above, cam wheel 26 will rotate in a counter-clockwise direction as viewed in FIGURES 3 and 4, with consequent, periodic descending movement of shutter 23 permitting sequential projection of reading matter r, line by line. After shutter 23 has been moved downwardly to its lower position (FIGURE 3) pin 39 will engage microswitch 81 to open the circuit and thus cause cessation of operation of device A. At this juncture the viewer may manually operate arm 52 to part shutter components 23', 23" to expose the entire frame 14 just previously projected to determine the degree of accuracy with which the same had been read. The user may then reinstitute operation of device A for projection of the next succeeding frame 14 by pressing pushbutton 66, and upon consequent rotation of shaft 27, shutter 23 will be lifted upwardly by cam surface 38 into starting position and will then progress downwardly in the manner above described until the motor 33 is de-energized by circuit opening through the next engagement of pin 39 with microswitch 81. It will be noted that film advancement arm 40 will, during the course of rotation of cam wheel 26 in each cycle, be brought into engagement with the aperture 16 of the frame 14 being then presently projected so that upon consequent engagement of pin 39 and arm 40 carrier 15 will be moved to present the next successive frame 14 while shutter 23 is being restored to starting position.

It will, of course, be recognized that power switch 64 may remain closed so that a user would only have to operate the pushbutton switch 66 for each frame 14. And further, it is obviously within the scope of one skilled in the art to utilize relays or like means so that device A would be in constant operation without momentary cessation between the projection of each frame 14. In any event, the basic cycle of operation for each frame 14 as above described would in no way be altered by the use of relays so that the inventive concept herein presented is not modified.

Through operation of resistor 70, the various speeds of rotation of cam wheel 26 may be effected so that shutter 23 will operate to expose for projection the lines l of reading matter r at relatively greater or lesser speeds. This is a most critical aspect of the present invention, since it assures that a viewer will be able to utilize device A while developing his proficiency, since a constant speed machine would be of little value.

Also, it is to be particularly noted that the training device of the present invention is adapted for utilization of what is generally known as the "expanded line" technique. The number of words exposed by the shutter opening may obviously be varied consonant with the extent of the opening and readability. Thus, two or three words may be spread out to constitute a single line or, if desired, conceivably ten or eleven words could be simultaneously exposed as constituting a single line. Therefore, the number of words presented to the screen at any one time may vary within the limits suggested, so that a marked range is effected. This variability when considered in conjunction with the varying speeds of exposure that may be produced by operation of the motor serve to provide a range which could not be produced by use of a variable speed motor alone, nor by use of the expanded line with a constant speed motor. This unique coaction renders device A capable of training a viewer to a level of proficiency hitherto deemed unobtainable by a single unit.

It should be understood that changes and modifications in the formation, construction, arrangement, and combination of the several parts of the reading training device may be made and substituted for these herein shown and described without departing from the nature and principle of our invention.

We claim:
1. A reading training device for use with a film strip having at least one frame with projectable matter thereon, comprising:
 a projector unit having cooperating condensing and projecting lens systems with a frame opening therebetween,
 means for receiving said film strip to present the frame thereof in alignment with said frame opening,
 a vertically presented shutter adapted for vertical reciprocal travel relatively to said frame opening and having an aperture for exposing for projection a portion of the projectable material on said frame,
 said shutter at its lower end having a cam following portion,
 a cam member adapted for rotation,
 said cam following portion of said shutter being supported, and being ridingly engaged directly upon said cam member,
 said cam having peripheral segments formed on decreasing radii for progressively stepping said shutter downwardly for sequentially exposing vertically arranged portions of the projectable material of the presented frame.

2. A reading training device for use with a film strip having at least one frame with projectable matter thereon, comprising:
 a projector unit having cooperating condensing and projecting lens systems with a frame opening therebetween,
 means for receiving said film strip to present the frame thereof in alignment with said frame opening,
 guideways provided on opposite sides of said frame opening on the side thereof remote from said presented frame,
 a vertically presented, plate-like shutter slideably received within said guideways for vertical reciprocal travel relatively of said frame opening,
 said shutter having a transversely extending, narrow opening for exposing therethrough a portion of the projectable material on said frame,
 said shutter at its lower end having a cam following portion,
 a cam member adapted for rotation being located below said shutter for engagement on its periphery with the cam following portion thereof whereby said shutter is supported in upright attitude by said cam member,
 said cam having peripheral segments formed on decreasing radii for progressively stepping said shutter downwardly for sequentially exposing vertically arranged portions of the projectable material of the presented frame.

3. A reading training device for use with a film strip having at least one frame with projectable matter thereon, comprising:
 a projector unit having cooperating condensing and projecting lens systems with a frame opening therebetween,
 means for receiving said film strip to present the frame thereof in alignment with said frame opening,
 a vertically presented shutter adapted for vertical travel relatively to said frame opening and having an aperture for exposing for projection a portion of the projectable material on said frame,
 a cam member adapted for rotation located below the lower end of said shutter and in planar aligned relationship therewith,
 a motor operably connected to said cam member for effecting rotation thereof,
 said shutter having a cam following portion at its lower end for ridingly engaging said cam member and for support thereby in vertical position,
 and speed control means for selectively varying the speed of said motor for controlling the rate at which said shutter travels downwardly and sequentially exposes portions of the presented frame.

4. A reading training device for use with a horizontally presented film strip having at least one frame with projectable matter, vertically presented thereon, comprising:
   a projector unit having cooperating condensing and projecting lens systems with a frame opening therebetween,
   means for receiving said film strip to present the frame thereof rigidly in alignment with said frame opening,
   a vertically presented plate-like shutter adapted for vertical reciprocal travel relatively to said frame opening and having an aperture for exposing for projection a portion of the projectable matter on said frame,
   said shutter incorporating a cam following portion in its lower end,
   a cam member adapted for rotation,
   said cam following portion of said shutter being supported on its lower end margin, and being ridingly engaged directly upon said cam member,
   said cam member having peripheral segments formed on decreasing radii for progressively stepping said shutter downwardly for sequentially exposing vertically arranged portions of the projectable matter on the presented frame,
   said cam having an enlarged peripheral portion for effecting return upward travel of said shutter to restore same to initial position for subsequent engagement with the said segments of decreasing radii.

5. A reading training device for use with a film strip having a plurality of frames with projectable matter thereon, comprising:
   a projection unit for said film strip,
   said film strip having an opening in correspondence to each frame thereon,
   an advancing arm mounted on said device below said film strip for reciprocal horizontal swingable movement,
   said arm having a finger at its upper end engageable with the openings of said film strip, said arm having a cam-follower-forming edge portion,
   cam means adapted for rotative movement for engaging the cam-follower portion of said arm during a predetermined portion of the angular travel of said cam means for effecting periodic swinging of said arm for causing same to advance said film strip through the projection unit,
   and means biasing said arm for presenting said finger for engagement within the openings of the frame.

References Cited by the Examiner
UNITED STATES PATENTS

| | | | |
|---|---|---|---|
| 1,287,183 | 12/18 | Bass | 352—207 |
| 1,558,145 | 10/25 | Citron | 88—26 |
| 2,252,726 | 8/41 | Peck | 35—35.2 |
| 2,357,593 | 9/44 | Leavell | 35—35.2 |

NORTON ANSHER, *Primary Examiner.*

EMIL G. ANDERSON, G. Y. CUSTER, *Examiners.*